United States Patent
Bouchet et al.

(10) Patent No.: US 7,746,546 B2
(45) Date of Patent: Jun. 29, 2010

(54) AMPLIFYING OPTICAL ELECTROMAGNETIC WAVE CONCENTRATOR

(75) Inventors: Olivier Bouchet, Rennes (FR); Adrian Mihaescu, Lannion (FR); Patrice Feron, Ploubezre (FR); Pascal Besnard, Lannion (FR)

(73) Assignee: France Telecom, Paris (FR)

( * ) Notice: Subject to any disclaimer, the term of this patent is extended or adjusted under 35 U.S.C. 154(b) by 647 days.

(21) Appl. No.: 11/570,301

(22) PCT Filed: Jun. 14, 2004

(86) PCT No.: PCT/EP2004/006421

§ 371 (c)(1),
(2), (4) Date: Dec. 8, 2006

(87) PCT Pub. No.: WO2005/124414

PCT Pub. Date: Dec. 29, 2005

(65) Prior Publication Data

US 2008/0013164 A1 Jan. 17, 2008

(51) Int. Cl.
*H01S 4/00* (2006.01)
*H04B 10/12* (2006.01)

(52) U.S. Cl. .................. 359/333; 359/341.1; 359/349; 385/40; 385/115

(58) Field of Classification Search .......... 359/333, 359/341.1, 349, 625; 385/33–35, 40, 115
See application file for complete search history.

(56) References Cited

U.S. PATENT DOCUMENTS

| 4,790,622 | A | * | 12/1988 | Levinson et al. .......... 385/80 |
| 5,231,533 | A | * | 7/1993 | Gonokami et al. .......... 359/328 |
| 5,357,101 | A | | 10/1994 | Plesko |
| 5,369,661 | A | | 11/1994 | Yamaguchi et al. |
| 6,064,067 | A | * | 5/2000 | Zhao et al. .................. 250/353 |
| 6,144,785 | A | * | 11/2000 | Fujita .......................... 385/24 |
| 6,198,567 | B1 | * | 3/2001 | Bergmann .................. 359/281 |
| 6,800,574 | B2 | * | 10/2004 | Anderson .................... 501/33 |
| 2002/0168139 | A1 | | 11/2002 | Clarkson et al. |

OTHER PUBLICATIONS

Peng et al., "Fiber-taper-coupled L-band Er3+-doped tellurite glass microsphere laser", Applied Physics Letters, vol. 82, No. 10, Mar. 2003, pp. 1497-1499.*

Yang et al., "Simulation of Impulse Response on IR Wireless Indoor Channel with Concentrator," Optical Wireless Communications V, Proceedings of SPIE, vol. 4873, pp. 71-78 (2002).

* cited by examiner

*Primary Examiner*—Eric Bolda
(74) *Attorney, Agent, or Firm*—Lowe Hauptman Ham & Berner LLP

(57) ABSTRACT

An amplifying optical electromagnetic wave concentrator includes an amplification focusing device and a receiver. The amplification focusing device focuses an incident optical electromagnetic wave on the receiver. The amplification focusing device is doped with active components and is subjected to an excitation wave that causes the active components to pass to an energy level such that interaction between the incident electromagnetic wave and the active components causes the active components to pass to a lower energy level and causes emission, towards the receiver, of at least one photon having the same wavelength as the incident electromagnetic wave. The focused photon or photons form an amplified wave of the incident electromagnetic wave.

18 Claims, 2 Drawing Sheets

AMPLIFYING OPTICAL ELECTROMAGNETIC WAVE CONCENTRATOR

RELATED APPLICATIONS

The present application is based on, and claims priority from International Application Number PCT/EP04/006421, filed Jun. 14, 2004, the disclosure of which is hereby incorporated by reference herein in its entirety.

FIELD OF THE INVENTION

The invention concerns an amplifying optical electromagnetic wave concentrator. It also concerns a device for receiving an optical electromagnetic wave comprising a plurality of such amplifying concentrators. It finds an application in fields requiring sensitive detection of electromagnetic radiation. In particular it finds an application in the fields of telecommunications by atmospheric optical connections and local wireless networks by optical connection of the infrared type.

BACKGROUND OF THE INVENTION

Communications by optical connection, in particular by infrared connection, take place between a transmitter that transmits the optical signal and a receiver that receives it. Because of losses, the energy of the optical signal transmitted by the transmitter is not entirely received by the receiver and the energy of the signal received may be low. In order to compensate for these losses and increase the energy of the received signal, a concentrator is placed in front of the receiver. This concentrator captures the beams that pass in the vicinity of the receiver and redirects them to the latter whilst focusing them, thus affording an increase in the energy of the received signal by concentration on the receiver.

Such an optical electromagnetic wave concentrator is described by Xin Yang in an article published by "SPIE Proceedings" of December 2002 (Proceedings of SPIE—Volume 4873—Optical Wireless Communications V, Eric J. Korevaar, Editor, December 2002, pp 71-78) under the title "Simulation of impulse response on IR wireless indoor channel with concentrator".

The concentrator has the shape of a truncated sphere placed in front of a detector, the radius of which is greater than the radius of the detector, thus making it possible to redirect the incident beams that are outside the field of the detector towards the detector. This type of concentrator gives satisfaction if the energies of the various optical beams received by the concentrator are not too low and if the concentration of the beams makes it possible to achieve a certain energy level affording good detection of the signal; in particular the total energy must make it possible to have an advantageous signal to noise ratio.

One object of the present invention is to propose an amplifying optical electromagnetic wave concentrator that does not have the drawbacks of the prior art.

SUMMARY OF THE INVENTION

To this end, an amplifying optical electromagnetic wave concentrator comprising at least one amplification focusing device and a receiver is proposed, the amplification focusing device being adapted to focus an incident optical electromagnetic wave on the receiver. The amplification focusing device is produced from a material doped with active components and is subjected to an excitation wave so as to make the active components pass to an energy level, such that the interaction between the incident electromagnetic wave and the said active components causes the said active components to pass to a lower energy level and causes the emission of at least one photon having the same wavelength as the incident electromagnetic wave towards the receiver, the focused part and the photon or photons emitted constituting an incident amplified wave of the incident electromagnetic wave.

The incident wave received by the focusing device is therefore amplified and the wave thus amplified makes it possible to achieve signal values sufficient to allow a good detection of the signal.

Advantageously, a variation of the power of the excitation wave in one direction causes a variation of the power of the incident amplified wave in the same direction. The power of the incident amplified wave that circulates in the waveguide can thus be controlled by the power of the excitation wave.

Advantageously, the amplification focusing device is spherical or hemispherical.

According to a first embodiment, the receiver is a waveguide adapted to conduct the incident amplified wave.

According to a variant of the first embodiment, the waveguide is an optical fibre.

Advantageously, the end of the optical fibre facing the amplification focusing device is provided with a microlens.

Advantageously, the amplifying concentrator comprises a tubular device in which the optical fibre is positioned and at the end of which the amplification focusing device is placed.

According to another variant of the first embodiment, the waveguide is a planar guide.

According to a second embodiment, the receiver is an optical to electrical converter.

Advantageously the excitation wave is a laser beam.

Advantageously the excitation wave is emitted towards the amplification focusing device from a waveguide adapted to conduct the excitation wave.

Advantageously, according to the first embodiment, the waveguide adapted to conduct the excitation wave is the waveguide adapted to conduct the incident amplified wave.

The invention also proposes a device for receiving an incident optical electromagnetic wave comprising a plurality of amplifying concentrators according to one of the preceding embodiments.

Advantageously the amplification focusing devices of the plurality of amplifying concentrators are distributed over a substantially hemispherical surface.

Advantageously the reception device comprises an optical adder connected to the plurality of receivers and adapted to add the energies of the signals issuing from each receiver.

Advantageously the reception device comprises an optical coupler or a demultiplexer connected to the output of the optical adder and into which the excitation wave is injected.

Advantageously the reception device comprises a device for measuring the energy of the wave output from the optical coupler or from the demultiplexer and the measuring device is adapted to control the power of the excitation wave.

Advantageously the reception device comprises an optical demultiplexer into which the excitation wave is injected and the outputs of which are connected to the plurality of wave guides adapted to conduct the excitation wave.

Advantageously the reception device comprises a device for measuring the energy of the electrical signal output from the electrical adder and the measuring device is adapted to control the power of the excitation wave.

The characteristics of the invention mentioned above, as well as others, will emerge more clearly from a reading of the following description of an example of an embodiment, the said description being given in relation to the accompanying drawings.

DETAILED DESCRIPTION OF THE DRAWING

Figure 1:
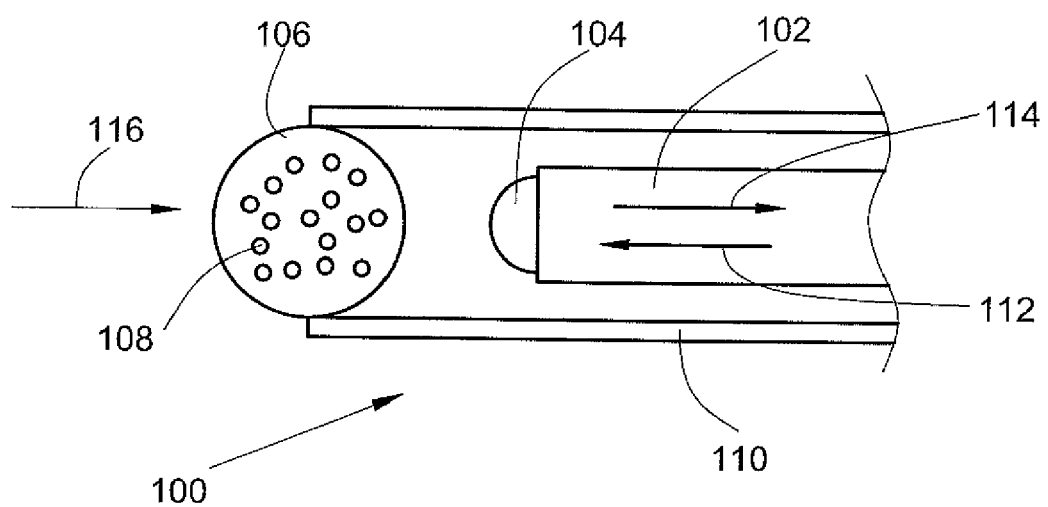
FIG. 1 is a drawing of an amplifying optical electromagnetic wave concentrator according to a first embodiment of the invention.
Figure 3:
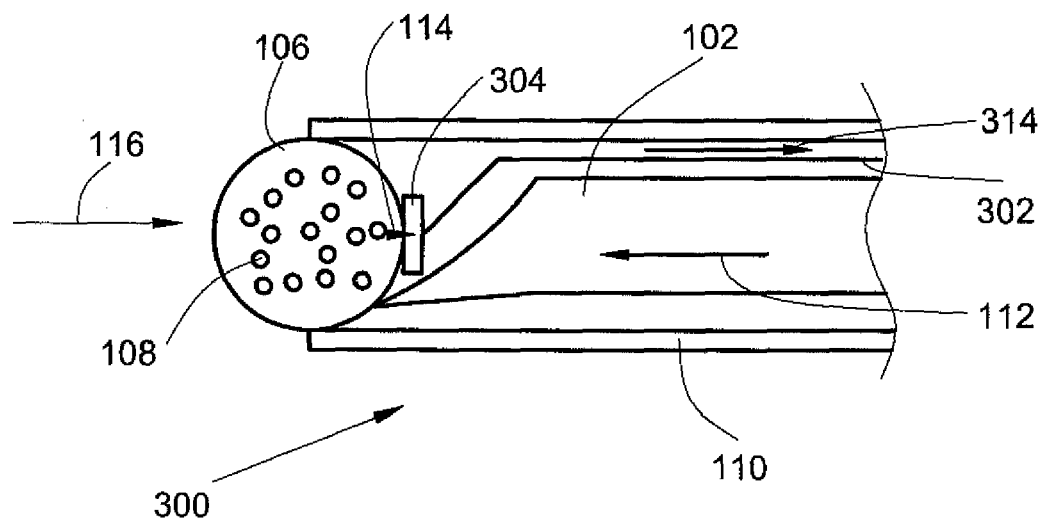
FIG. 3 is a drawing of an amplifying optical electromagnetic wave concentrator according to a second embodiment of the invention.

FIG. 1 is a drawing of an amplifying optical electromagnetic wave concentrator 100 according to a first embodiment and FIG. 3 depicts an amplifying optical electromagnetic wave concentrator 300 according to a second embodiment.

Each amplifying concentrator 100, 300 comprises at least one amplification focusing device 106 and respectively a receiver 102, 304. The amplification focusing device 106 is adapted to focus an incident optical electromagnetic wave 116 onto respectively the receiver 102, 304.

The amplification focusing device 106 is produced from a material doped with active components 108 and is subjected to an excitation wave 112 that makes the active components 108 pass to a so-called higher energy level. This so-called higher energy level is such that the interaction between the incident electromagnetic wave 116 and the said active components 108 causes the said active components 108 to pass to a lower energy level and causes the emission of at least one photon having the same wavelength as the incident electromagnetic wave towards respectively the receiver 102, 304.

The active components 108 are said to be adapted to the wavelength of the incident electromagnetic wave 116, that is to say they emit a photon having the same wavelength as that of the photons of the incident electromagnetic wave 116, when they are illuminated by the incident electromagnetic wave 116. There is then a photomultiplication of the part of the incident electromagnetic wave 116 picked up by the amplification focusing device 106, which increases the energy level of the wave received and then transmitted respectively to the receiver 102, 304.

The focused part of the incident optical electromagnetic wave 116 and the photon or photons emitted then constitute an incident amplified wave 114 of the incident wave 116.

In other words, the incident optical electromagnetic wave 116 illuminates the amplification focusing device 106, which also receives the excitation wave 112 and transmits the incident amplified wave 114 in the direction respectively of the receiver 102, 304.

The active components 108 can be of the atom, atomic ion, molecule, molecular ion or other type.

The amplification focusing device 106 is therefore illuminated by the incident optical electromagnetic wave 116 that issued from a transmitter and makes it possible to concentrate and focus the part of the electromagnetic wave issuing from the transmitter and received by the amplification focusing device 106 towards respectively the receiver 102, 304. The fitting of a doped material also allows an amplification of the signal transmitted from the amplification focusing device 106 to respectively the receiver 102, 304.

According to the first embodiment depicted in FIG. 1, the receiver can be a waveguide 102 adapted to conduct the incident amplified electromagnetic wave 104 thus concentrated and focused towards a processing device that will be explained below. The use of a waveguide 102 makes it possible to offset the processing device from the amplification focusing device 102, unlike the prior art, which makes it necessary to mount the detector behind the concentrator.

The waveguide 102 can be an optical fibre at the end of which a microlens 104 can be mounted, opposite the amplification focusing device 106, in order to focus the amplified beams issuing from the amplification focusing device 106 towards the centre of the optical fibre 102.

In the particular case shown in FIG. 1, the amplification focusing device 106 in the form of a sphere and the waveguide 102 in the form of an optical fibre are placed inside a tubular device 110, for example in the form of a silica tube, which facilitates the fitting of the optical fibre 102 with respect to the amplification focusing device 106. The optical fibre 102 is positioned in the tubular device 110 and the amplification focusing device 106 is placed at the end of the tubular device 110. In addition, the tubular device 110 allows the adjustment of the device between the end of the optical fibre 102 and the amplification focusing device 106, in order to position this end at the region where the maximum concentration of energy is situated, and moreover it prevents to the maximum possible extent the losses of energy between the amplification focusing device 106 and the optical fibre 102 by keeping the beams issuing from the amplification focusing device 106 between its internal walls.

The waveguide 102 can also be a planar guide on which for example hemispherical alveoli are produced allowing the fitting of one or more amplification focusing devices 106 in the form of spheres.

According to the second embodiment depicted in FIG. 3, the receiver can be an optical to electrical converter 304 adapted to receive the incident amplified electromagnetic wave 114 and to convert it into an electrical signal 314 transported by an electric cable 302. The optical to electrical converter 304 can for example be of the APD diode type (Avalanche Photodiode in English). Advantageously, a filter placed between the optical to electrical converter 304 and the amplification focusing device 106 makes it possible to select only the desired incident wavelength or wavelengths from on the one hand the incident amplified electromagnetic wave 114 and on the other hand the excitation wave 112.

Depending on the elements constituting the amplifying concentrator 100 and the properties of the incident electromagnetic wave 116, the coupling between the amplification focusing device 106 and the receiver 102, 304 can be critical or non-critical.

The amplification focusing device 106 offers a maximum angular opening of 90°, directly dependent on the refractive index of the amplification focusing device 106.

In particular, the amplification focusing device 106 can take any form offering an appropriate angular opening, such as for example a glass hemisphere or sphere.

Controlling the energy level of the excitation wave 112 affords direct control of the amplification level, that is to say of the level of the signal detected. In general terms, a variation of the power of the excitation wave 112 in one direction causes a variation of the power of the incident amplified wave 114 in the same direction, that is to say an increase in the power of the excitation wave 112 will cause an increase in the number of photons emitted and therefore an increase in the power of the incident amplified wave 114, whilst a reduction in the power of the excitation wave 112 will cause a reduction in the number of photons emitted and therefore a reduction in the power of the incident amplified wave 114.

The photomultiplication thus achieved affords an amplification of the energy that enters respectively the receiver 102, 304 and therefore better detection of the signal transported by the incident wave.

As material for the amplification focusing device 106, it will be possible to use fluorinated, phosphate, silicate, titanate or other glasses in the form of spheres with a diameter of around 100 micrometers, and as active components it will be possible to use, depending on the wavelength of the incident electromagnetic wave, erbium, ytterbium, neodymium or other ions or a combination of these elements.

These various characteristics and the concentration of the active components 108 must be chosen according to their reactivity vis-à-vis the wavelengths of the incident electromagnetic wave 116 and so as to obtain an amplification effect without generating a laser effect; for example, the concentration of the active components 108 will be around 0.01 moles to 15 moles percent.

For example, in the case of an incident electromagnetic wave 116 lying in the 1060-1100 nm band, use will be made of an amplification focusing device 106 made from fluorinated or silicate glass doped with neodymium ion at concentrations of between 0.01 moles to 15 moles percent.

The small dimensions of the various elements constituting the device guarantee a small overall size.

The use of a component based on glass guarantees high stability of the device vis-à-vis variations in temperature, and in fact these elements are little sensitive to variations in temperature.

The excitation wave 112 can be a so-called pumping laser beam that supplies an addition of energy to the active components 108 of the amplification focusing device 106, thus exciting the active components 108 and enabling them to pass to the higher energy level.

For example, for an incident electromagnetic wave 116 whose wavelength is situated at approximately 1550 nm, the addition of energy supplied by the excitation wave 112 will be approximately from a few microwatts to a few milliwatts for an amplification focusing device 106 and the wavelength of the excitation wave 112 will be around 980 nm or around 1480 nm in the case of doping with the erbium ion, whose resonant frequencies are situated at approximately 980 nm and 1480 nm or in the case of an erbium/ytterbium co-doping whose resonant frequency is around 980 nm.

The source of the emission of the excitation wave 112 can be placed anywhere with respect to the amplification focusing device 106, provided that the excitation wave 112 illuminates the amplification focusing device 106. For reasons of saving in space, it is advantageous for the source to be placed at the end of a waveguide adapted to conduct the excitation wave 112 placed opposite the amplification focusing device 106.

When the receiver is an optical to electrical converter 304, the waveguide adapted to conduct the excitation wave 112 is an optical fibre 102, preferably tapered to enable it to be fitted close to the optical to electrical converter 304.

When the receiver is a waveguide, it is advantageous for the waveguide adapted to conduct the excitation wave 112 and the waveguide 102 adapted to conduct the incident amplified electromagnetic wave 114 to be the same. The excitation wave 112 is thus emitted towards the amplification focusing device 106 from the waveguide 102.

Figure 2:
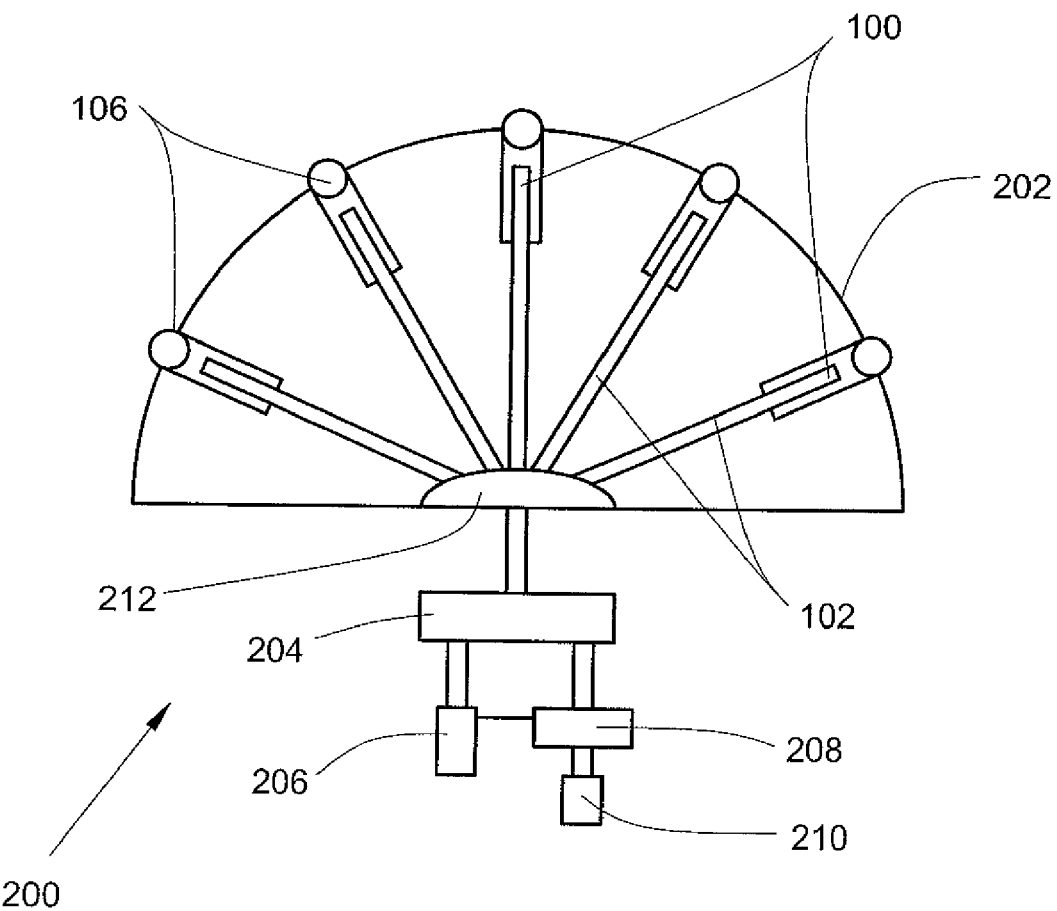
FIG. 2 is a drawing of a reception device comprising a plurality of amplifying electromagnetic wave concentrators according to the first embodiment of the invention.
Figure 4:
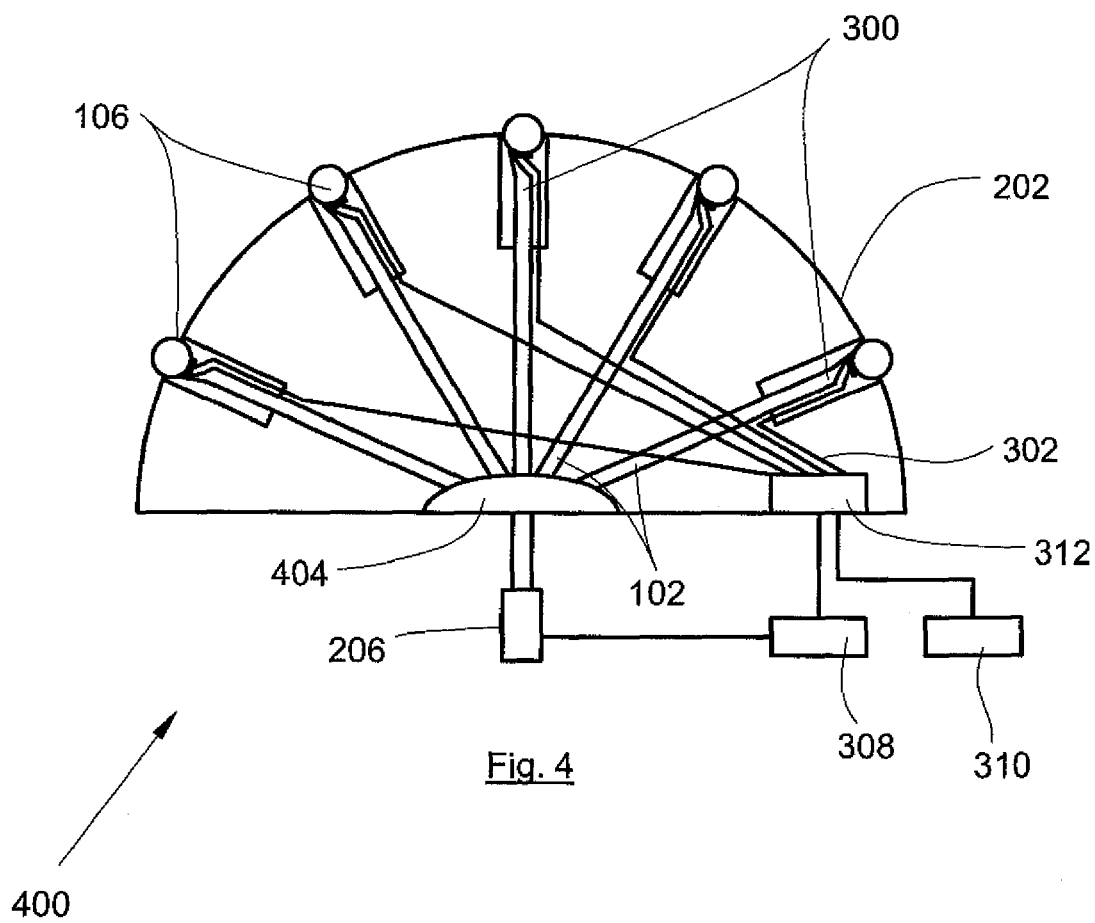
FIG. 4 is a drawing of a reception device comprising a plurality of amplifying electromagnetic wave concentrators according to the second embodiment of the invention.

FIG. 2 depicts a device 200 for receiving an incident electromagnetic wave comprising a plurality of amplifying concentrators 100 according to the first embodiment and FIG. 4 depicts a device 400 for receiving an incident electromagnetic wave comprising a plurality of amplifying concentrators 300 according to the second embodiment and whose spatial distribution makes it possible to cover a specific angular opening.

For example, in the case of an atmospheric optical connection, the incident electromagnetic wave generally has the form of a beam with a small angle of dispersion and the amplifying concentrators 100, 300 must be located so as to cover only the incident beam without being able to pick up the stray electromagnetic waves. The amplifying concentrators 100, 300 will therefore be concentrated in a restricted region.

In the case of local networks, the incident electromagnetic wave is emitted in all directions with a large angle of dispersion and the amplifying concentrators 100, 300 must be able to pick up the maximum amount of energy issuing from this wave, whether it be directly or after reflection. The arrangement of the amplifying concentrators 100, 300 must then cover an extended angular opening, in particular 180°, and the amplification focusing devices 106 of the plurality of amplifying concentrators 100, 300 will be distributed over a surface 202, which may be substantially hemispherical or other depending on the desired amplification characteristics and the characteristics of the incident wave.

An increase in the number of amplifying concentrators 100, 300 will give rise to an increase in the amplification. The density of the amplifying concentrators 100, 300 and their arrangement will be able to be different according to the application and the amplifications necessary.

The reception device 200, 400 can also comprise an adder 212, 312 connected to the plurality of receivers 102, 304 of the amplifying concentrators 100, 300 and adapted to add the energies of the signals issuing from each receiver 102, 304.

In the case where the receivers are waveguides 102, the adder is an optical adder 212 and the energies of the signals are the energies of the incident amplified electromagnetic waves 114. The inputs of the optical adder 212 are connected with the waveguides 102 of the plurality of amplifying concentrators 100. The optical adder 212 adds the energies of the incident amplified electromagnetic waves 114 conducted by each waveguide 102, and its output can be injected into a coupler or a demultiplexer 204. The coupler or demultiplexer 204 can then be connected on the one hand to a device 208 for measuring the energy of the wave output from the coupler 204 and on the other hand to an excitation wave generator 206. The output of the measuring device 208 can be injected into an optical to electrical converter 210 in the case of a requirement for conversion of the light signal and the measuring device 208 can be connected to the generator 206 in order to control its power.

The functioning of the reception device 200 is then as follows. Part of the incident wave is captured by the plurality of amplifying concentrators 100 and is amplified on passing through the amplification focusing devices 106. The waveguides 102 situated behind each amplification focusing device 106 therefore receive, through one end, an amplified part 114 of the incident wave and conducted as far as another end. All these other ends are connected to the adder 212, which makes it possible to generate a wave whose light energy is substantially equal to the sum of the light energies of the electromagnetic wave parts 114 transmitted by the waveguides 102.

The optical coupler or demultiplexer 204 connected to the output of the optical adder 212 injects the excitation wave 112 issuing from the generator 206 into the waveguide 102. The power delivered by the generator 206 must be sufficient to supply all the amplification focusing devices 106.

The amplification generated by the active components 108 can give rise to the production of a wave whose optical energy is high and it is then advantageous to be able to control the energy level of the wave output from the coupler 204. The device 208 measuring the energy of the wave output from the coupler 204 makes it possible to check this level with respect to a maximum level and when the level exceeds the maximum level the measuring device 208 is able to reduce the power of the excitation wave 112 by acting on the generator 206. In a similar manner, when the level is less than a minimum level, the measuring device 208 is able to increase the power of the excitation wave 112.

When the light signal is to be converted into an electrical signal, the optical to electrical converter 210 is placed at the output of the measuring device 208, but this optical to electrical converter 210 is unnecessary when the subsequent processing of the light signal is carried out by an all-optical device.

Where the receivers are optical to electrical converters 304, the adder is an electrical adder 312 and the energies of the signals are the energies of the electrical signals 314. The inputs of the electrical adder 312 are connected to the electrical cables 302 of the plurality of amplifying concentrators 300. The electrical adder 312 creates an incident electrical signal by adding the electrical energies issuing from the optical to electrical converters 304 and representing the incident amplified electromagnetic waves 114 issuing from each amplification focusing device 106. The output of the electrical adder 312 can be injected on the one hand into a device 310 for processing the incident electrical signal and on the other hand into a device 308 for measuring the energy of the incident electrical signal.

The reception device 400 comprises an optical demultiplexer 404 that receives as an input the excitation wave 112 emitted by the generator 206 and emits part of the excitation wave 112 output in the direction of the plurality of waveguides adapted to conduct the excitation wave 112.

The measuring device 308 can be connected to the generator 206 in order to control its power.

The functioning of the reception device 400 is then as follows. Part of the incident wave is captured by the plurality of amplifying concentrators 300 and amplified on passing through the amplification focusing devices 106, and is then converted into an electrical signal 314 by means of the optical to electrical converters 304, which are connected to the electrical adder 312 by means of the electric cables 302.

The electrical adder 312 generates a signal whose energy level is substantially equal to the sum of the energy levels of the electrical signals 314 transmitted by the cables 312 from the optical to electrical converters 304.

The demultiplexer 404 injects the excitation wave 112 issuing from the generator 206 into the waveguides 102. The power delivered by the generator 206 must be sufficient to supply all the amplification focusing devices 106.

The amplification generated by the active components 108 can give rise to the production of a wave whose optical energy is high and it is then advantageous to be able to control the energy level of the wave output from the generator 206. The device 308 measuring the electrical energy output from the electrical adder makes it possible to check this level with respect to a maximum level and when the level exceeds the maximum level the measuring device 308 is able to reduce the power of the excitation wave 112 by acting on the generator 206. In a similar manner, when the level is less than a minimum level, the measuring device 208 is able to increase the power of the excitation wave 112.

Naturally the present invention is not limited to the examples and embodiments described and depicted but is capable of many variants accessible to persons skilled in the art.

For example, the amplifying concentrator 100, 300 and the reception device 200, 400 are not limited to the processing of an electromagnetic wave with a single wavelength but can process waves with several wavelengths.

It will then be possible to dope the amplification focusing device 106 with several active components 108, each active component 108 being adapted to at least one wavelength.

Amplifying concentrators 100, 300 adapted to each wavelength can also be installed in the reception device 200, 400.

The various components of the reception device 200 are shown as being distant from one another and connected by waveguides but they can also be mounted on one another in order to avoid insertion losses.

The invention claimed is:

1. Amplifying optical electromagnetic wave concentrator comprising at least one amplification focusing device and a receiver,
    the amplification focusing device being adapted to focus an incident optical electromagnetic wave on the receiver,
    the amplification focusing device including material doped with at least one active component,
    an excitation wave source for supplying electromagnetic energy to the amplification focusing device for causing the at least one active component to pass to an energy level such that interaction between the incident electromagnetic wave and the at least one active component causes the at least one active component to pass to a lower energy level and causes emission of at least one photon having the same wavelength as the incident electromagnetic wave towards the receiver, whereby focused photon or photons adapted to be emitted by the at least one active component are in an amplified wave of the incident electromagnetic wave, the amplified wave being adapted to be incident on the receiver,
    the receiver including a waveguide adapted to conduct the incident amplified wave, the excitation wave being adapted to be emitted towards the amplification focusing device from the waveguide adapted to conduct the excitation wave, the waveguide adapted to conduct the excitation wave being adapted to conduct the incident amplified wave.

2. Amplifying concentrator according to claim 1, wherein a power variation of the excitation wave in one amplification direction causes a variation of the power of the incident amplified wave in the same amplification direction.

3. Amplifying concentrator according to claim 1, wherein the amplification focusing device has a spherical or hemispherical shape.

4. Amplifying concentrator according to claim 1, wherein the waveguide is an optical fibre.

5. Amplifying concentrator according to claim 4, wherein the optical fibre has an end opposite the amplification focusing device that includes a microlens.

6. Amplifying concentrator according to claim 4, further including a tubular device in which the optical fibre is positioned, the tubular device having an end where the amplification focusing device is located.

7. Amplifying concentrator according to claim 1, wherein the waveguide is a planar guide.

8. Amplifying concentrator according to claim 1, wherein the excitation wave source is a laser beam source.

9. Device for receiving an incident optical electromagnetic wave comprising a plurality of amplifying concentrators according to claim 1.

10. Reception device according to claim 9, wherein the amplification focusing devices of the plurality of amplifying concentrators are distributed over a substantially hemispherical surface.

11. Reception device according to claim 9, further including an adder connected to the plurality of receivers and adapted to add the signals issuing from each receiver.

12. Reception device according to claim 11 wherein the receivers include waveguides, the reception device including an optical coupler or a demultiplexer connected to the output of the adder and adapted to be responsive to the excitation wave.

13. Reception device according to claim 12, further including a device for measuring the energy of the wave derived from the optical coupler or from the demultiplexer and a power controller arranged to be responsive to the measuring device for controlling the power of the excitation wave.

14. Reception device according to claim 11 wherein the receivers include optical to electrical converters, the reception device including an optical demultiplexer arranged to be responsive to the excitation wave and having outputs connected to the plurality of waveguides adapted to conduct the excitation wave.

15. Reception device according to claim 14, further including a device for measuring the energy of the electrical signal derived from the adder and a power controller arranged to be responsive to the measuring device for controlling the power of the excitation wave.

16. Reception device for receiving an incident optical electromagnetic wave comprising:

a plurality of optical electromagnetic wave amplifying concentrators, each of the optical electromagnetic wave amplifying concentrators comprising at least one amplification focusing device and a receiver, each of the amplification focusing devices being adapted to focus an incident optical electromagnetic wave on the receiver, the amplification focusing device including material doped with at least one active component, the amplification focusing device being adapted to be responsive to an excitation wave for causing the at least on active component to pass to an energy level such that interaction between the incident electromagnetic wave and the at least one active component causes the least one active component to pass to a lower energy level and causes the emission of at least one photon having the same wavelength as the incident electromagnetic wave towards the receiver, the focused photon or photons adapted to be emitted by the active components being in an incident amplified wave of the incident electromagnetic wave, each receiver including an optical to electrical converter, an adder connected to the plurality of receivers and adapted to add the energies of the signals derived from each receiver, and an optical demultiplexer for receiving the injected excitation wave and having outputs which are connected to the plurality of the waveguides adapted to conduct the excitation wave.

17. Reception device according to claim 16, further including a device for measuring the energy of the electrical signal derived from the adder and a power controller arranged to be responsive to the measuring device for controlling the power of the excitation wave.

18. Reception device for receiving an incident optical electromagnetic wave comprising:

a plurality of amplifying optical electromagnetic wave concentrators, each of the amplifying optical electromagnetic wave concentrators comprising at least one amplification focusing device and a receiver, each of the amplification focusing devices being adapted to focus an incident optical electromagnetic wave on the receiver, the amplification focusing device including a material doped with at least one active component, the amplification focusing device being adapted to be responsive to an excitation wave for causing the least one active component to pass to an energy level such that interaction between the incident electromagnetic wave and the at least one active component causes the at least one active component to pass to a lower energy level and causes the emission of at least one photon having the same wavelength as the incident electromagnetic wave towards the receiver, the focused photon or photons adapted to be emitted by the active components being in an incident amplified wave of the incident electromagnetic wave, the amplification focusing devices of the plurality of amplifying concentrators being distributed over a substantially hemispherical surface, an adder connected to the plurality of receivers and adapted to add the signals derived from each receiver, the receivers including waveguides, the reception device including an optical coupler or a demultiplexer connected to the output of the optical and adapted to be responsive to the excitation wave, a device for measuring the energy of the wave derived from the optical coupler or from the demultiplexer and a power controller arranged to be responsive to the measuring device for controlling the power of the excitation wave.

* * * * *